United States Patent Office 2,978,472
Patented Apr. 4, 1961

2,978,472

CORROSION INHIBITING OXIDATES AND PROCESS FOR THEIR PRODUCTION

George B. Kirkwood, Port Arthur, and John H. Greene, Groves, Tex., assignors to Texaco Inc., a corporation of Delaware No Drawing. Filed Jan. 24, 1958, Ser. No. 710,856

4 Claims. (Cl. 260—451)

This invention relates to novel corrosion inhibiting liquid oxidates of refined paraffinic lubricating oils and to a method of producing the same. Additionally the invention includes a method pertaining to the use of the novel oxidates in preventing corrosion of metal bodies in contact with petroleum liquids, and also includes novel compositions consisting essentially of petroleum liquids and the novel oxidates.

Our liquid oxidates are characterized by light color, excellent solubility in petroleum fractions and are immiscible and substantially unreactive to water. They find particular use as corrosion preventing additives in petroleum distillates, e.g., lubricating oils, gasoline, diesel oils, jet fuels and furnace oils in that they reduce or prevent the corrosion of metals, e.g., iron, in contact with these distillates without imparting thereto, dark color, insoluble materials, ash, water miscibility and other inferior fuel characteristics.

The oxidation of refined paraffinic lube oils with air results in the production of a heterogeneous mixture of oxygenated compounds. Not only are many different types of oxygenated oils produced but oxygenates of a wide molecular weight range result because oxidation is accomplished by substantial chain degradation even where a charge material of a narrow boiling range is employed. The complexity of the oxidation product is apparent from the brief review of the type of oxygenates obtained. Acids, alcohols, aldehydes, esters and ketones are all produced directly or indirectly in the oxidation reaction. Despite the extensive nature of the prior art on hydrocarbon oxidation, both technical and patent literature are deficient in teaching our novel oxidates, method of producing same, their use in preventing corrosion and the petroleum liquid-oxidate compositions resulting therefrom.

In accordance with the process of this invention, our paraffinic oil oxidate is obtained by reacting a refined paraffinic lube oil with air, in the presence of a metalliferous oxidation catalyst in a catalytic amount, e.g., between about 0.1 and 2% by weight of the charge oil, at an air feed rate of about 8-50 cu. ft./lb. oil/hr., at an air velocity of about 0.1 to 6 ft./sec. in an oxidation temperature range of about 250-400° F. and at a pressure of about 30-300 pounds per square inch gage (p.s.i.g.). The preferred conditions are an air feed rate of 10-25 cu. ft./lb. oil/hr., an air velocity of about 0.2 to 1 ft./sec., an oxidation initiation temperature of 330-370° F., an oxidation reaction temperature of 260-300° F., 50-90 p.s.i.g. and potassium permanganate catalyst in an amount of about 0.4% to 1.2% by weight of the charge oil, more preferably in the range of about 1 to 1.2%. The oxidation is continued until the oil is oxidized to a neutralization number (Neut. No.) between about 55 and 80, preferably between 60 and 70. Approximately between 1-6 hours reaction time is necessary to arrive at a Neut. No. in the desired range.

When the oxidation step is completed, the liquid oxidate is rapidly cooled to below about 200° F. prior to removal from the reactor at a cooling rate of about 5 to 50° F./minute, preferably between about 10 to 15° F./minute. The oxidate is then withdrawn from the reactor and preferably filtered to remove any solids contained therein.

Employing the above prescribed conditions, there is obtained in about 1-6 hours (1-3 hours using the preferred charge oils and process conditions), our novel liquid oxidates having a Neut. No. between about 55 and 80, a saponification number (Sap. No.) between about 100 and 200, an unsaponifiable content less than about 55%, a viscosity less than 200 Saybolt Universal seconds (SUS) at 210° F., a color rating less than 200 in the Lovibond ½" cell, and a pour point less than 30° F. The preferred liquid oxidates of our invention have a Neut. No. between 60 and 70, a Sap. No. between 120 and 165, an unsaponifiable content less than 55%, a viscosity less than 100 SUS at 210° F., a Lovibond ½" cell color rating of less than 100 and a pour point less than about 10° F.

The critical features in obtaining a liquid oxidate of the aforementioned characteristics are charge material, presence of catalyst, maintenance of the prescribed pressure and temperature conditions, use of the prescribed air rate and air velocity and the rapid cooling of the liquid oxidate prior to withdrawal from the reactor.

The choice of charge material is extremely important and critical for it must, upon oxidation, produce under commercially economic and feasible reaction times, temperatures and pressure, a liquid oxidate which has a Neut. No. between about 55 and 80, a pour point of less than 30° F., good solubility in hydrocarbon fractions, water unreactivity, light color and superior corrosion inhibiting properties. We have discovered that such a charge material is refined paraffinic lubricating oil having a viscosity of between 90 and 350 SUS at 100° F., preferably between 140 and 180 SUS at 100° F., a pour point less than 10° F., preferably less than 5° F., a Lovibond ½" cell color rating of less than 10 and an aniline point between 210-230° F., preferably between 215 and 225° F. The charge oil is derived by selectively refining a crude lubricating paraffinic oil distillate by standard methods as follows:

(1) Sulfuric acid treating to remove unstable and asphaltic materials, thereby improving color stability and oxidation characteristics of the oil.

(2) Solvent refining, e.g., with furfural, phenol, dichloroethyl ether to selectively remove aromatics thereby further improving color characteristics and raising the viscosity index (V.I.) of the oil.

(3) Clay contacting, e.g., with bentonite to further remove bodies, e.g., resins, which tend to color upon oxidation.

(4) Solvent dewaxing, e.g., with methyl ethyl ketone and toluol mixture to remove the dissolved waxes thereby reducing pour point and cloud tendencies when dissolved in petroleum distillate stocks.

We have found the refined paraffinic lubricating oil charge material is difficult to oxidize in a relatively short reaction time under moderate oxidation temperatures and pressures in comparison to the waxes of substantially the same carbon chain length, i.e. between 18 and 33 carbon atoms. Therefore, it is necessary to incorporate in our process, a catalyst to increase the rate of reaction thereby permitting the use of shorter reaction times, lower reaction temperatures and pressures. Generally, oil soluble oxidation catalysts will suffice, e.g., potassium permanganate, manganese stearate, manganese naphthenate and zinc stearate to mention only a few. Preferably, potassium permanganate in an amount ranging between about 0.4 and 1.2% by weight of the total paraffinic oil charge is employed; 3-10% potassium permanganate water solutions are used to introduce the required catalyst to the reaction zone. Excellent distribution of the KMnO₄ through the oil is obtained in the induction period during which air is blown through the reaction mixture and the temperature and pressure are raised to initiate oxidation. The water evaporates during the induction period leaving the catalyst distributed through the oil charge in a uniform manner.

The oxidation is initiated and conducted in the temperature range between about 250 and 400° F. Under the preferred operating conditions the temperature is raised to between 330–370° F. During the induction period in order to more quickly initiate oxidation and then upon initiation lowered to between 260° F. and 300° F. At temperatures below about 250° F. oxidation will proceed so slowly as to make production of the desired liquid oxidate commercially unfeasible. At temperatures above about 400° F. the charge oil upon oxidation will be converted into heavy tars and asphalt-like residues. As a general rule it is preferable to use the lowest reaction temperature which will give a reasonable reaction rate. The reason for this is the higher the reaction temperature the darker the color and the higher the hydrocarbon insoluble content of the liquid oxidate product for a given Neut. No. Dark colors and high hydrocarbon insoluble material contents are undesirable features. Conventional means of indirect heat exchange are ordinarily employed to maintain the temperature within the prescribed range.

The use of the prescribed pressure range of 30–300 p.s.i.g. is another important factor in producing the oil oxidates of the desired characteristics. The preferred pressure conditions are between 50–90 p.s.i.g. The utilization of the specified pressure conditions not only result in the production of the desired liquid oxidate but also make it possible to achieve the desired product in a commercially feasible period of time. At atmospheric pressures, the oxidation is several times slower even at substantially higher oxidation temperatures. In addition, the longer period of oxidation required as a result of pressures below 30 p.s.i.g. result in the production of an oxidate which is solid rather than liquid. Pressures above about 300 p.s.i.g. are less desirable from an economic and reaction control aspect, since heavier and more expensive equipment will be required and the reaction will proceed so rapidly as to make proper control of oxidation difficult.

The time of reaction is determined by the Neut. No. desired and is usually 1–3 hours under the preferred conditions. During a typical run, samples are drawn off from the reactor at periodic intervals for testing, and the oxidation step is terminated upon reaching the Neut. No. in the range between 55 and 80, preferably between 60 and 70.

The criticality of maintaining the Neut. No. of the liquid oxidate within the range between about 55 and 80 is that within this range the oxidate has the combined properties of good corrosion inhibition and relatively low hydrocarbon insoluble material content. The liquid oxidates having a Neut. No. value between 60 and 70 best compromise the desirable corrosion inhibition property with the undesirable hydrocarbon insoblue feature.

In more detailed explanation it has been discovered that the corrosion inhibiting effectiveness of the novel liquid oxidates rapidly increase with the increasing Neut. No. value thereof. This rapid increase continues until a Neut. No. value of about 60 is attained after which the additional increase in corrosion protection afforded by the higher Neut. No. oxidates is not commercially significant.

It has also been observed that as the Neut. No. of the liquid oxidates increase, the hydrocarbon insoluble content thereof also increases. The rate of increase of hydrocarbon insolubles (appearing as solids in the crude oxidate product) remains relatively low until a Neut. No. of about 84 is obtained after which the rate of insoluble formation sharply increases. The amount of hydrocarbon insoluble in the liquid oxidate does not reach commercially undesirable proportions, i.e., above about 20 volume percent, until the paraffinic oil is oxidized above about a Neut. No. of 80. Large hydrocarbon insoluble contents although not substantially affecting the corrosion inhibiting effectiveness of the liquid oxidate product are undesirable in that they form visible emulsions in petroleum distillates. Such visible emulsions handicap the sale of the distillate in the commercial market. Therefore, when a liquid oxidate product of relatively high hydrocarbon insoluble content is to be incorporated in petroleum distillates, the oxidate should be filtered in order to remove the insoluble materials. Filtration of liquid oxidates of low hydrocarbon insoluble content may also be carried out if desired. In any case, the larger the quantity of insolubles, the longer the period of filtration, the more numerous the filter changes and the lower the yield of purified liquid oxidate product. Longer filtration periods, increased filter changes and low yields all undesirably contribute to the higher cost of the inhibitor.

In a typical filtering operation a 130 ft.² Oliver precoated vacuum filter having fine diatomaceous silica forming the precoat is used. Other filtering apparatus which may be used are the leaf or plate and frame type filters.

In order that the filtration rate be of a satisfactory speed it is generally desirable to conduct the filtration of the undiluted oxidate at an elevated temperature, e.g., between 100 and 200° F. The crude oxidate may also be diluted with a light petroleum solvent to hasten filtration, e.g., 1 part (wt.) kerosene to 3 parts (wt.) crude oxidate. The diluted oxidate is preferably filtered at temperatures of less than 100° F. in order to avoid the formation of a haze.

In addition to the above, the petroleum distillate containing the liquid oxidates of a Neut. No. above about 80, when brought into contact with water, tend to form scums and laces at the interface. Since in the storage and transportation of hydrocarbon, water is generally present, it is commercially undesirable to have an additive which will impart these lace and scum formation properties to the distillate.

Another important factor in the oxidate production method of this invention is the rate at which air is passed through the reactor. An air feed rate of 8–50 cu. ft./lb. oil/hr. should be employed to obtain the desired product. Air rates between 10 and 25 cu. ft./lb. oil/hr. are used in the preferred type of operation. Air rates of the prescribed range result in proper correlation of agitation and contact time to produce the desired liquid oxidate at the prescribed temperature and pressure conditions. It should be noted that the amount of air passing through the reactor is considerably in excess of that which actually enters into the reaction. The air rate is a factor in defining the degree of agitation and prescribing proper time of contact. Air rates above 50 cu. ft./lb. oil/hr. tend to cause flooding and undesirable cooling while rates below 8 cu. ft./lb. oil/hr. do not impart sufficient agitation to the charge oil to obtain a uniform oxidation.

Maintenance of the prescribed air velocity in the reactor is also an essential factor in the production of the liquid oxidates. By air velocity we mean the quotient of the expression (cubic feet per second of air feed measured at 60° F. and reactor inlet pressure: cross section of the empty reactor in square feet). It has been found that operating at an air velocity above about 6 ft./sec. caused excessive entrainment of the liquid particles in the overhead vapor in spite of an efficient separating apparatus. The yield of oxidate product was substantially lower than when the air velocities were maintained within about 0.1 to 6 ft./sec. It was further found that when the air velocity is reduced below about 0.1 ft./sec. the reaction mixture is insufficiently agitated with a corresponding increase in the time necessary to oxidize the oil to the desired Neut. No., notwithstanding the fact that the air so supplied was greatly in excess of that needed for oxidizing the oil to the desired Neut. No.

The final important factor in the liquid oxidate production method is the rapid cooling, i.e., at a rate between about 5° and 50° F./min. of the liquid oxidate immediately following attainment of the desired Neut. No. We have discovered that if the liquid oxidate is drawn from the reactor at the oxidation temperature, e.g., 270° F., the product upon natural cooling to room temperature is about four times darker than if the liquid oxidate is first rapidly cooled, e.g., by circulating cold water through the heat exchanger located within the reactor, to below about 200° F. before withdrawing from the reactor. A light colored oxidate is extremely important when used as a corrosion inhibiting additive in light colored petroleum stocks, e.g., gasoline. A dark colored oxidate will so discolor these stocks as to render them unsalable.

As heretofore disclosed, the liquid oxidates prevent or retard rusting of metal bodies in contact with petroleum hydrocarbon liquids such as gasoline, kerosene, diesel fuel and furnace oil. Particular metal bodies envisioned are iron pipelines and iron tanks as in tanker ships used to transport distillates of the above type. However, protection may be applied to other metal bodies such as heat exchangers through which petroleum hydrocarbon coolants are circulated, and oil well tubing.

Rusting frequently occurs in pipelines and storage tanks when containing gasoline or other distillates. This is in part believed due to the moisture which is present in the pipelines and tanks and in part to corrosive bodies dissolved in the distillate itself. Many chemical additives have been incorporated in light distillates to prevent or retard rusting. However, in the past, it has not been possible to obtain satisfactory protection and good solubility at reasonable cost. Among the additives which have been suggested are the oxidized microcrystalline paraffin waxes and the microcrystalline petrolatums. While these materials give good results in preventing rust, they have the major drawback of being solids. From a practical note to incorporate these solid wax oxidates in a rust inhibiting amount in petroleum distillate, it is first necessary to dissolve one part wax oxidate in at least about two parts solvent. Our novel oxidates, on the other hand, being liquids, do not require solvent dilution at moderate temperatures and thus can be directly incorporated in the petroleum distillate in their concentrated form. This results in a large saving from the cost and time standpoint, since the expense of solvent and time required for mixing is eliminated.

At the lower temperatures, e.g., below about 50° F. it has been found necessary in some instances to cut back the liquid oxidate with between about 10 and 30 volume percent of a light petroleum solvent, particularly when the liquid oxidate is to be handled by a centrifugal or reciprocating pump. In any case much less solvent is required than is required for a solid oxidate. We have found that centrifugal and reciprocating pumps, respectively, can handle liquids having viscosities up to 1000 and 5000 SUS at 50° F. We have discovered the novel liquid oxidates can be reduced to a viscosity below about 1000 SUS at 50° F. by diluting about 3 parts by volume liquid oxidate with about one part by volume petroleum solvent. Furthermore, we have discovered the liquid oxidates may be reduced to a viscosity below about 5000 SUS at 50° F. by diluting about nine parts oxidate with one part by volume of petroleum solvent. Specific examples of petroleum solvents contemplated herein are gasoline, kerosene, and naphtha. A naphtha having gravity of about 37.5° API, a flash point of about 162° F., a boiling range of about 370 to 455° F. and a 50% ASTM distillation point of about 388° F. is a preferred solvent.

The amount of our liquid oxidate included in the distillates may range from about 1 to about 50 pounds (lbs.) per thousand barrels (M bbls.) of distillate, e.g., gasoline. Typical concentrations that have been found highly useful in preventing rusting of iron surfaces are about 4 to 8 pounds of oxidate per M bbls. of distillate passed through a pipeline and about 10 to 20 lbs. per M bbls. of distillate in a tanker. The higher concentration is required in the tanker because the distillate is non-flowing and therefore allows the residual water remaining from a previous tank washing to accumulate in the bottom of the tank where it causes extensive corrosion. In pipelines, on the other hand, water particles tend to be suspended in the flowing distillate and cause less corrosion, thus requiring less oxidate.

Specific illustrations of our invention are found in the following examples:

EXAMPLE I

There was charged to an aluminum reactor provided with a heat exchange surface, 150 lbs. of a paraffinic oil obtained by furfural refining, sulfuric acid treating, clay contacting and solvent dewaxing a crude paraffinic oil distillate. The charge oil had the following properties:

| | |
|---|---|
| Gravity, °API | 31.8 |
| Flash, COC, °F. | 400 |
| Fire, COC, °F. | 455 |
| Viscosity: | |
| 100° F., SUS | 143.6 |
| 210° F., SUS | 42.5 |
| Pour point, °F. | —5 |
| Color, Lovibond, ½″ cell | 5 |
| Viscosity index | 92.9 |
| Aniline point °F. | 217 |
| Ash, percent | None |
| Sulfur, percent | 0.13 |
| Iodine No. | 27 |

There was also charged to the reactor an aqueous solution of potassium permanganate prepared by dissolving 0.6 pound of $KMnO_4$ in 10 pounds of water. Air blowing was initiated as soon as the total charge mixture was introduced into the reactor. The reaction mixture was initially heated to a temperature of about 350° F. by heat exchange in order to initiate the reaction. After initiation the reaction mass was rapidly cooled to an operating temperature of 270° F. During the induction period, the pressure was adjusted to 65 p.s.i.g., an air rate of 20 standard cu. ft./lb. oil/hr. and an air velocity of about 0.5 ft./sec. The reaction was continued for a period of 2 hours, during which time the oxidate reached a Neut. No. of 70.7 in a yield of approximately 96.0% oxidate based on the hydrocarbon charge. The low molecular weight fractions were entrained in the exit gases and were therefore not included in the yield calculation. The reaction mass was then rapidly cooled to below 200° F. by water cooled heat exchange tubes located within the reactor. The product obtained was a liquid characterized by the following tests:

| | |
|---|---|
| Neut. No. | 70.7 |
| Sap. No. | 145 |
| Unsaponifiable matter, wt. percent | 43.5 |
| Viscosity: | |
| 100° F., SUS | 1970 |
| 210° F., SUS | 84.2 |
| Color, Lovibond ½″ cell | 75 |
| Gravity, °API | 15.3 |
| Pour point | 0 |

EXAMPLE II

There was charged to an aluminum reactor provided with a heat exchange surface 150 pounds of paraffinic oil obtained by furfural refining, acid treating, clay contacting and solvent dewaxing a crude paraffinic oil distillate. The charge oil had the following properties:

| | |
|---|---|
| Gravity, °API | 32.0 |
| Flash, COC, °F. | 425 |
| Fire, COC, °F. | 460 |
| Viscosity: | |
| 100° F., SUS | 142.1 |
| 210° F., SUS | 42.6 |
| Pour point, °F. | 5 |
| Color, Lovibond, ½" cell | 5 |
| Viscosity index | 98.2 |
| Aniline point, °F. | 217 |
| Ash, percent | .002 |
| Sulfur, percent | 0.15 |
| Iodine No. | 25 |

The charge oil was oxidized in accordance with the procedure of Example I with the following exceptions:
(1) Oxidation was conducted for 1.8 hours.
(2) 0.9 pound KMnO₄ was used as catalyst.

The product obtained was a liquid characterized by the following tests:

| | |
|---|---|
| Neut. No. | 62 |
| Sap. No. | 126 |
| Unsaponifiable matter, wt. percent | 51.3 |
| Viscosity: | |
| 100° F., SUS | 1096 |
| 210° F., SUS | 75 |
| Color, Lovibond ½" cell | 50 |
| Gravity, °API | 16.1 |
| Pour point, °F. | 0 |

EXAMPLE III

In a commercial operation there was charged to an aluminum reactor 3,287 pounds of paraffinic oil of the type described in the previous example. The procedure used was essentially that of Example I. The oxidate product was also filtered to remove the hydrocarbon insolubles. The operating conditions, yields and properties of the resultant liquid oxidate product are set forth below:

| | |
|---|---|
| Operating conditions: | |
| Reaction time, hrs. | 2½ |
| Catalyst concentration (KMnO₄), wet percent | 0.4 |
| Initiation temperature, °F. | 350 |
| Reaction temperature, °F. | 273 |
| Pressure, p.s.i.g. | 65 |
| Air rate: | |
| Standard cu. ft./hr. | 40,000 |
| Standard cu. ft./lb. oil/hr. | 12.1 |
| Air velocity, ft./sec. | 0.5 |
| Product withdrawal temperature, °F. | 175 |
| Cooling time, minutes | 10 |
| Cooling rate, °F./min. | 9.8 |
| Yield data: | |
| Charge oil, lbs. | 3287 |
| Crude oxidate product, lbs. | 3240 |
| Yield, wt. percent | 98.5 |
| Tests on crude oxidate product: | |
| Neut. No. | 57 |
| Sap. No. | 117 |
| Percent unsaponifiable | 51.9 |
| Gravity, °API | 16.5 |
| Viscosities: | |
| SUS at 100° F. | 1163 |
| SUS at 210° F. | 77.4 |
| Pour, °F. | +15 |
| Ash, percent | 0.31 |
| Color, ½" Lovibond cell | 40 |
| Filtering yield: | |
| Oxidate charge, gallons | 2161 |
| Filtered oxidate, gallons | 1815 |
| Yield, vol. percent | ¹84 |
| Flash, COC, °F. | 465 |

¹ Yield somewhat low due to equipment failure.

EXAMPLE IV

This example shows the importance of catalyst in the suggested amounts in our oxidation method.

The procedure of Example I was thrice repeated using KMnO₄ catalyst concentrations of 0%, 0.2% and 1%, respectively. The charge oil had the following properties:

| | |
|---|---|
| Gravity, °API | 31.9 |
| Flash, COC, °F. | 430 |
| Fire, COC, °F. | 465 |
| Viscosity: | |
| 100° F., SUS | 145.6 |
| 210° F., SUS | 42.7 |
| Pour point, °F. | −10 |
| Color, Lovibond ½" cell | 5 |
| Viscosity index | 94.6 |
| Aniline point, °F. | 217 |
| Ash, percent | 0.08 |
| Sulfur, percent | 0.16 |
| Iodine No. | 23 |

The three respective products obtained after a reaction time of two hours were liquid and were characterized by the following tests:

| Catalyst Concentration | 0% | 0.2% | 1% |
|---|---|---|---|
| Product Characteristics: | | | |
| Neut. No. | 4 | 39 | 73 |
| Sap. No. | 2 | 80 | 138 |
| Unsaponifiable Matter, Wt. Percent | 95 | 70 | 50 |
| Gravity, °API | 31.9 | 20.6 | 15.4 |
| Viscosity: | | | |
| 100° F., SUS | 137.6 | 589 | 975 |
| 210° F., SUS | 42.3 | 59.5 | 72.5 |
| Color, Lovibond ½" Cell | 20 | (¹) | (¹) |
| Pour Point, °F. | 5 | 5 | 5 |
| Viscosity Index | 98 | 50 | 49 |

¹ Too hazy to test.

EXAMPLE V

The procedure of Example I is repeated thrice using as a charge oil three refined paraffinic lube oils respectively having the following properties:

| | Run I | Run II | Run III ¹ |
|---|---|---|---|
| Gravity, °API | 34.0 | 31.2 | 26.8 |
| Flash, COC, °F. | 390 | 405 | 530 |
| Fire, COC, °F. | 435 | 460 | 595 |
| Viscosity: | | | |
| 100° F., SUS | 96.5 | 171.3 | 1,200 |
| 210° F., SUS | 39.1 | 44.5 | 93.0 |
| Pour Point, °F. | 0 | 0 | 0 |
| Color, Lovibond ½" Cell | 5 | 5 | 50 |
| Viscosity Index | 99 | 97 | 87.4 |
| Aniline Point, °F. | 213 | 222 | 245 |
| Ash, Percent | 0 | .01 | 0 |
| Sulfur, Percent | 0.27 | 0.12 | 0.42 |
| Iodine No. | 10 | 25 | 16 |

¹ This charge oil is outside the viscosity range contemplated by the invention.

Runs I–III are allowed to proceed for 5, 2 and 6 hours respectively with production of liquid oxidates of the following characteristics.

| | Run I | Run II | Run III |
|---|---|---|---|
| Neut. No. | 64 | 60 | 44 |
| Sap. No. | 160 | 126 | 119 |
| Unsaponifiable content, percent | 47 | 51.5 | 44 |
| Viscosity: | | | |
| 100° F., SUS | 850 | 1,650 | 25,000 |
| 210° F., SUS | 70 | 95 | 385 |
| Gravity, °API | 16 | 16.8 | 14 |
| Pour Point, °F. | 10 | 25 | 35 |
| Viscosity Index | 43.5 | 37.5 | 60 |
| Color, Lovibond ½" Cell | 10 | 55 | 440 |

The criticality of the charge material can be seen by comparing run III with both runs I and II. Charge oils of runs I and II having a viscosity at 100° F., less than 175 SUS oxidized to a Neut. No. in the 60–70 range in five hours or less. The charge oil of run III which has a viscosity of 1200 SUS at 100° F. could only be oxidized to a Neut. No. of 44 after six hours which is well below the Neut. No. range contemplated by this invention. In addition the oxidates of runs I and II were of light color and had good fluidity. On the other hand, the oxidate of run III was of dark color and had a tar-like consistency.

EXAMPLE VI

The procedure of Example I is repeated using the charge oil described therein with the exception that the oxidation is performed under atmospheric pressure rather than 65 p.s.i.g. and the oxidation reaction temperature is maintained at 330° F. rather than 270° F. after 2 hours of reaction time, the charge oil is oxidized to a Neut. No. of 35. The product obtained is a liquid characterized by the following tests:

| | |
|---|---|
| Neut. No. | 35 |
| Sap. No. | 117 |
| Unsaponifiable content | 44 |
| Viscosity: | |
| 100° F., SUS | 4400 |
| 210° F., SUS | 155 |
| Color, Lovibond ½″ cell | 900 |
| Gravity, ° API | 15 |
| Pour point, ° F. | 14.5 |
| Viscosity index | 43 |

A comparison of the above oxidate with the oxidate of Example I shows the criticality of our process conditions. In other words, using superatmospheric pressure and a lower oxidation temperature, we are able to produce an oxidate in a given period of time having a substantially higher Neut. No., lighter color characteristics and a lower viscosity and pour point than if operating at a higher temperature and at atmospheric pressure.

EXAMPLE VII

This example shows the necessity of rapidly reducing the temperature of the liquid oxidate to below about 200° F. prior to withdrawing from the reactor.

Three separate runs were conducted. In each there was charged to an aluminum reactor provided with a heat exchange surface 150 pounds of paraffinic oil obtained by furfural refining, acid treating, clay contacting and solvent dewaxing crude paraffinic oil distillate. The charge oil had the following properties:

| | |
|---|---|
| Gravity, ° API | 32 |
| Flash, COC, °F. | 400 |
| Fire, COC, ° F. | 430 |
| Viscosity: | |
| 100° F., SUS | 144.7 |
| 210° F., SUS | 42.9 |
| Pour point, ° F. | 0 |
| Ash, percent | 0.001 |
| Color, Lovibond ½″ cell | 5 |
| Sulfur, percent | 0.16 |
| Aniline point, ° F. | 217 |

In each run there was also charged to the reactor an aqueous solution of potassium permanganate prepared by dissolving 0.6 of a pound of $KMnO_4$ in 10 pounds of water. Air blowing was initiated as soon as the total charge mixture was rapidly heated to a temperature of 350° F. by a heat exchanger. After initiation of the oxidation, the reaction mixture was rapidly cooled to an operating temperature of 270° F. During the induction period, pressure was adjusted to 65 p.s.i.g., the air rate to 20 standard cu. ft./lb. oil/hr. and the air velocity to about 0.5 ft./sec. The oxidation was continued for a period of about two hours subsequently followed by rapid heat exchanger cooling and periodic withdrawals of the liquid oxidate product from the reactor. During the latter cooling step the water rate through the reactor coils was so adjusted that the cooling rate of the product was between 8–12° F./min. In the first run samples were withdrawn at 270, 250, 230 and 210° F. In the second run samples were withdrawn at 200, 180 and 150° F. In the third run a single sample was withdrawn at 140° F. All samples were then filtered and allowed to naturally cool to ambient temperature before testing.

Colors on each sample withdrawn were obtained immediately after withdrawing, after one week and after one month of storage at room temperature. In addition, the samples were subjected to other tests upon withdrawal. These data are listed subsequently and show that when the temperature of the liquid oxidate in the reactor is reduced by rapid cooling to below about 200° F. prior to withdrawal, a product of lighter color, greater fluidity and lower pour point is produced than when the product is withdrawn above about 200° F.

| | Run I | | | | Run II | | | Run III |
|---|---|---|---|---|---|---|---|---|
| Amount Product Withdrawn (gal.) | 5 | 5 | 5 | 5 | 5 | 5 | 5 | 5 |
| Drawing Temp., ° F | 270 | 250 | 230 | 210 | 200 | 180 | 150 | 140 |
| Product Characteristics: | | | | | | | | |
| Neut. No. | 61 | 61 | 61 | 61 | 63.8 | 63.8 | 63.8 | 62 |
| Sap. No. | 138 | 138 | 138 | 138 | 146 | 146 | 146 | 126 |
| Gravity, ° API | 15.3 | 15.3 | 15.3 | 15.3 | 15.8 | 15.8 | 15.8 | 16.1 |
| Viscosity— | | | | | | | | |
| 100° F., SUS | 1,429 | 1,429 | 1,429 | 1,429 | 723 | 723 | 723 | 1096 |
| 210° F., SUS | 84.9 | 84.9 | 84.9 | 84.9 | 80.2 | 80.2 | 80.2 | 75 |
| Pour Point, ° F | 10 | 10 | 10 | 10 | 0 | 0 | 0 | 0 |
| Color, Lovibond ½″ cell [1]— | | | | | | | | |
| Original | 250 | 160 | 135 | 145 | 50 | 50 | 60 | 75 |
| Stored 1 week | 250 | 160 | 130 | 140 | 55 | 55 | 55 | 80 |
| Stored 1 month | 250 | 160 | 135 | 140 | 65 | 60 | 60 | 95 |

[1] Samples filtered to remove haze.

Corrosion inhibition

The principles of this invention as applied to corrosion inhibition will be illustrated by the following specific examples which demonstrate the improved results obtained when inhibiting petroleum distillates, e.g., gasoline by incorporating therein our novel oxidates produced in accordance with the process heretofore described.

The following tests were used:

QUICKIE CORROSION TEST

In this test a polished steel strip is placed in a four ounce bottle containing 110 cc. of test distillate (gasoline) at 90° F. The strip and distillate are then allowed to stand for 15 minutes. Next, 20 cc. of distillate are poured out and 20 cc. of distilled sea water is added to the bottle and the bottle is shaken for 15 seconds in a horizontal position. The bottle is then turned to a vertical position, given a short swirl to wash the water from the strip and placed upright. Readings of the percent of rust on the strip in the distillate phase are taken after 3 hours.

FOURTEEN DAY CYCLING TEST

This test procedure simulates tanker transportation service between a Texas Refinery and an East Coast port when gasoline is hauled north and the return voyage made under water ballast. The method consists of immersing for seven days in a tall four ounce bottle a weighed, polished steel strip in contact with 5 cc. of synthetic sea water and 110 cc. of gasoline. The liquids are then removed and 115 cc. of fresh salt water is added, after which there is an additional seven day storage period. The steel strip is then removed, cleaned and reweighed. The bottles are kept in an oven at 90° F. for the storage period.

WATER REACTION TEST

This test consists of adding 80 cc. of filtered, rerun iso-octane inhibited with oxidate (20 lbs. oxidate/M bbls. iso-octane) to 20 cc. of a solution having a pH of 7 consisting of 1.15 grams of $K_2HPO_4 + 0.46$ gram $KH_2PO_4$ in 100 milliliters of distilled water in a stoppered graduated cylinder. The mixture is then agitated by shaking for a period of 2 minutes. The sample is then allowed to settle undisturbed for a maximum period of 5 minutes in order to allow the inhibited iso-octane and water solution to form separate layers.

The following numerical ratings were used to evaluate the appearance of the sample at the end of the 5 minute settling period:

| Rating: | Appearance |
|---|---|
| 1 | Clear and clean. |
| 1b | A few bubbles around the periphery of the interface and no shreds of lace and/or film at the interface. |
| 2 | Shred of lace and or film at the interface. |
| 3 | Loose lace and/or slight scum. |
| 4 | Light lace and/or heavy scum. |

This test is conducted in accordance with military specification, MIL–I–25017. In order for the inhibitor to pass this military specification, the rating should not be greater than 2 and the inhibited iso-octane should separate sharply from the water layer with substantially no evidence of emulsion or suspended matter within or upon either layer.

KEROSENE SOLUBILITY TEST

This test indicates the solubility of oxidates in petroleum distillates.

Heat the oxidate to 130° F. Add 20 grams of the heated oxidate to a four ounce bottle, then add 40 grams of kerosene. Stir until solution is obtained, reheat, if necessary. Allow the bottle to stand in a vertical position for 24 hours at room temperature. The percent insolubility is determined by observing the volume of sediment based on the total volume in the bottle.

EXAMPLE VIII

Six liquid oxidate samples were prepared by oxidizing a refined paraffinic lubricating oil having the properties described in Example I at an oxidation reaction temperature of 270° F., a pressure of 65 p.s.i.g., an air rate of 20 cu.ft./lb. oil/hr., an air velocity of about 0.5 ft./sec. using an 0.4% $KMnO_4$ as catalyst for 1, 2, 3, 4, 5 and 6 hours, respectively. Their respective characteristics are as follows:

Sample B is within the scope of the invention and the remaining five samples are outside the Neut. No. range contemplated herein. The following tests indicate the necessity of maintaining the Neut. No. within the about 55 to 80 range in order to balance good corrosion inhibition with satisfactory solubility and unreactivity to water.

EXAMPLE VIIIa
QUICKIE CORROSION TEST

| Dosage, lbs./M bbls.[1] | | 0 | 6¾ | 12 | 18 |
|---|---|---|---|---|---|
| Sample | Neut. No. | Percent Rusting of Metal Strip | | | |
| A | 38 | | 15 | 19 | 11 |
| B | 61 | | 7 | 2 | 2 |
| C | 84 | | 3 | 3 | 3 |
| D | 96 | | 3 | 2 | 2 |
| E | 104 | | 3 | 2 | 0 |
| F | 115 | | 3 | 3 | 2 |
| Blank | | 25 | | | |

[1] Dosage expressed in pounds of liquid oxidate per 1000 barrels gasoline distillate.

EXAMPLE VIIIb
FOURTEEN DAY CYCLING TEST

| Dosage, lbs./M bbls.[1] | | 0 | 6 | 12 | 18 |
|---|---|---|---|---|---|
| Sample | Neut. No. | Wt. Loss Test Strip (milligrams) | | | |
| A | 38 | | 55.7 | 45.9 | 33.0 |
| B | 61 | | 33.0 | 29.3 | 22.4 |
| C | 84 | | 45.7 | 32.7 | 23.5 |
| D | 96 | | 39.3 | 24.2 | 20.6 |
| E | 104 | | 22.8 | 20.1 | 21.7 |
| F | 115 | | 27.9 | 23.0 | 20.7 |
| Blank | | 72.6 | | | |

[1] Dosage expressed in pounds of liquid oxidate per 1000 barrels gasoline distillate.

| Dosage, lbs./M bbls.[1] | | 0 | 6 | 12 | 18 |
|---|---|---|---|---|---|
| Sample | Neut. No. | Percent Wt. Loss Reduction of Test Strips | | | |
| A | 38 | | 23.3 | 36.8 | 54.5 |
| B | 61 | | 54.5 | 59.6 | 69.1 |
| C | 84 | | 37.1 | 55.0 | 67.6 |
| D | 96 | | 45.9 | 66.7 | 71.6 |
| E | 104 | | 68.6 | 72.3 | 70.1 |
| F | 115 | | 61.6 | 68.3 | 71.5 |
| Blank | | 0 | | | |

[1] Dosage expressed in pounds of liquid oxidate per 1000 barrels gasoline distillate.

EXAMPLE VIIIc
WATER REACTION TEST

| Sample | Neut. No. | Appearance of Inhibited Iso-octane layer [1] | Water Reaction Rating |
|---|---|---|---|
| A | 38 | clear | 2 |
| B | 61 | slightly hazy | 2 |
| C | 84 | cloudy | 4 |
| D | 96 | do | 4 |
| E | 104 | do | 4 |
| F | 115 | do | 4 |

[1] Each sample becomes progressively more cloudy.

| Sample | Oxidation Time, Hrs. | Neut. No. | Sap. No. | Unsap. Content, Wt. Percent | Pour Point, °F. | Gravity, °API | Viscosity, 210° F., SUS | Color, Lovibond, ½" Cell |
|---|---|---|---|---|---|---|---|---|
| A | 1 | 38 | 90 | 63.7 | 0 | 21.7 | 58.6 | 80. |
| B | 2 | 61 | 132 | 49 | 10 | 16.5 | 77.5 | 110. |
| C | 3 | 84 | 182 | 38 | 10 | 12.9 | 114.5 | Too dark to test. |
| D | 4 | 96 | 208 | 33 | 20 | 10 | 143.7 | Do. |
| E | 5 | 104 | 226 | 29.5 | 20 | 7.8 | 192 | Do. |
| F | 6 | 115 | 255 | 26.2 | 50 | 6.5 | 259 | Do. |

EXAMPLE VIIId

KEROSENE SOLUBILITY TEST [1]

| Sample | Neut. No. | Percent Insoluble in Kerosene, Volume Percent |
|---|---|---|
| A | 38 | 0.5 |
| B | 61 | 11 |
| C | 84 | 22 |
| D | 96 | 34 |
| E | 104 | 42 |
| F | 115 | 53 |

[1] One part oxidate: 2 parts kerosene, weight percent.

EXAMPLE IX

A liquid oxidate was prepared by oxidizing a refined (sulfuric acid treated, solvent refined, clay contacted, solvent dewaxed) paraffinic lubricating oil having the following properties:

| | |
|---|---|
| Gravity, °API | 34.0 |
| Flash, COC, °F | 390 |
| Fire, COC, °F | 435 |
| Viscosity: | |
| 100° F., SUS | 96.5 |
| 210° F., SUS | 39.1 |
| Pour point, °F | 0 |
| Color, Lovibond ½″ cell | 5 |
| Viscosity index | 99 |
| Aniline point, °F | 213 |
| Ash, percent | 0 |
| Sulfur, percent | .27 |
| Iodine No | 10 | at an oxidation reaction temperature of 270° F., a pressure of 65 p.s.i.g., an air rate of 20 cu.ft./lb. oil/hr., an air velocity of about 0.5 ft./sec. using 0.4% KMnO₄ as catalyst. The liquid oxidate product had the following characteristics:

| | |
|---|---|
| Neut. No | 66 |
| Sap. No | 163 |
| Unsaponifiable material, wt. percent | 46.7 |
| Viscosity, 210° F., SUS | 76 |
| Gravity, °API | 15.9 |
| Pour point, °F | 10 |
| Color, Lovibond ½″ cell | 85 |

In a corrosion test the following results were obtained with the above material, dosages being expressed in pounds of liquid oxidate per 1000 barrels gasoline distillate.

EXAMPLE IXa

QUICKIE CORROSION TEST

| Dosage, lbs./M bbls. | 0 | 12 | 18 |
|---|---|---|---|
| Percent Rust on Metal Strip | 25 | 4 | 4 |

EXAMPLE IXb

FOURTEEN DAY CYCLING TEST

| Dosage, lbs./M bbls. | 0 | 12 | 18 | 20 |
|---|---|---|---|---|
| Wt. Loss of Test Strip (milligrams) | 74.0 | 26.2 | 28.0 | 25.3 |
| Percent Wt. Loss Reduction of Test Strip | 0 | 64.6 | 62.2 | 65.8 |

Obviously, many modifications and variations of the invention as hereinbefore set forth may be made without departing from the spirit and scope thereof and therefore only such limitations should be imposed as are indicated in the appended claims.

We claim:

1. A method of producing a paraffinic lubricating oil liquid oxidate characterized by a Neut. No. between about 55 and 80, a Sap. No. between about 100 and 200, and an unsaponifiable content less than about 55 wt. percent comprising reacting in the presence of a catalytic amount of a metalliferous catalyst, a refined paraffinic lubricating oil with air at an air rate of about 8–50 cu. ft./lb. oil/hr., at an air velocity of about 0.1 to 6 ft./sec., at an oxidation temperature between about 250 and 400° F. and at a pressure between about 30 and 300 p.s.i.g., subsequently cooling said oxidate at a cooling rate between about 5 and 50° F./minute, said lubricating oil having a viscosity between 90 and 350 SUS at 100° F., a pour point less than 10° F., an aniline point between 210 and 230° F., and a Lovibond ½″ cell color rating of less than 100.

2. A method of producing a paraffinic lubricating oil liquid oxidate characterized by a Neut. No. between 60 and 70, a Sap. No. between 120 and 165 and an unsaponifiable content less than 55 wt. percent which comprises reacting in the presence of between about 0.4 and 1.2% potassium permanganate, a paraffinic lubricating oil with air at an air rate of 10 to 25 cu.ft./lb. oil/hr., at an air velocity of about 0.2 to 1 ft./second, at a pressure between 50 and 90 p.s.i.g., at an oxidation initiation temperature of between 330 and 370° F., and upon initiation of oxidation, reducing said initiation temperature to a reaction temperature of between 260 and 300° F., subsequently cooling said liquid oxidate to below about 200° F. at a cooling rate between about 10–15° F./minute prior to withdrawing said oxidate from the reactor, said lubricating oil having a viscosity between 140 and 180 SUS at 100° F., a pour point less than 5° F., a Lovibond ½″ cell color rating of less than 10 and an aniline point between 215 and 225° F.

3. A refined paraffinic lubricating oil liquid oxidate characterized by a Neut. No. between about 55 and 80, a Sap No. between about 100 and 200, an unsaponifiable content less than about 55 wt. percent, a pour point less than 30° F., a viscosity less than 200 SUS at 210° F. and a Lovibond ½″ cell color rating of less than 200.

4. A refined paraffinic lubricating oil liquid oxidate characterized by a Neut. No. between 60 and 70, a Sap. No. between 120 and 165, an unsaponifiable content less than 55 wt. percent, a pour point less than about 10° F., a viscosity less than 100 SUS at 210° F. and a Lovibond ½″ cell color rating less than 100.

References Cited in the file of this patent

UNITED STATES PATENTS

| | | |
|---|---|---|
| 2,118,915 | Butz | May 31, 1938 |
| 2,250,468 | Cockerille | July 29, 1941 |
| 2,682,553 | Kirk et al. | June 29, 1954 |
| 2,705,241 | McKinley et al. | Mar. 29, 1955 |
| 2,727,005 | McKinley | Dec. 13, 1955 |
| 2,814,596 | Whittleton | Nov. 26, 1957 |
| 2,862,802 | Oosterhout | Dec. 2, 1958 |
| 2,894,970 | McKinley et al. | July 14, 1959 |